(12) United States Patent
Socarras et al.

(10) Patent No.: US 9,720,486 B2
(45) Date of Patent: Aug. 1, 2017

(54) METHOD AND DEVICE FOR NOISE REDUCTION IN MULTI-FREQUENCY CLOCKING ENVIRONMENT

(71) Applicants: ADVANCED MICRO DEVICES, INC., Sunnyvale, CA (US); ATI TECHNOLOGIES ULC, Markham (CA)

(72) Inventors: Angel E. Socarras, Sunnyvale, CA (US); Fei Guo, Markham (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 119 days.

(21) Appl. No.: 14/865,928

(22) Filed: Sep. 25, 2015

(65) Prior Publication Data
US 2017/0090542 A1 Mar. 30, 2017

(51) Int. Cl.
G06F 1/32 (2006.01)
G06F 1/06 (2006.01)

(52) U.S. Cl.
CPC ............... *G06F 1/324* (2013.01); *G06F 1/06* (2013.01)

(58) Field of Classification Search
CPC .................... G06F 1/06; G06F 1/324
See application file for complete search history.

(56) References Cited

U.S. PATENT DOCUMENTS

| | | | |
|---|---|---|---|
| 2008/0141062 A1* | 6/2008 | Yamaoka | G06F 1/3203 713/501 |
| 2009/0072885 A1* | 3/2009 | Kawasaki | G06F 1/26 327/519 |
| 2014/0095909 A1* | 4/2014 | Turullols | G06F 1/10 713/322 |

* cited by examiner

*Primary Examiner* — Albert Wang
(74) *Attorney, Agent, or Firm* — Faegre Baker Daniels LLP

(57) ABSTRACT

A device and method of operating a synchronous frequency processing environment served by a common power source and common clock source. The method includes operating the processing environment to have a first power consumption. The method further includes determining a first synchronous frequency processing domain within the processing environment where it is desired to implement a first clock frequency alteration in a clock signal for the first synchronous frequency processing domain. The first clock frequency alteration generates an associated first alteration in a power consumption from the first synchronous frequency processing domain. The method further includes determining a second clock frequency alteration to a clock signal for a second synchronous frequency processing domain of the processing environment. The second clock frequency alteration is determined so as to reduce a change in the first power consumption caused by the first alteration in power consumption.

20 Claims, 7 Drawing Sheets

| Clock# | GROUP A CLOCK ENABLE | Pulses | % Freq |
|---|---|---|---|
| 0 | 0 1 0 1 0 1 0 1 0 1 0 1 0 1 0 1 0 1 0 1 0 1 0 1 0 1 0 1 0 1 0 1 | 16 | 0.0% |
| 32 | 0 1 0 1 1 1 0 1 0 1 0 1 0 1 0 1 0 1 0 1 0 1 0 1 0 1 0 1 0 1 0 1 | 17 | 6.3% |
| 64 | 0 1 0 1 1 1 0 1 0 1 0 1 0 1 0 1 0 1 1 1 0 1 0 1 0 1 0 1 0 1 0 1 | 18 | 12.5% |
| 96 | 0 1 0 1 1 1 0 1 0 1 0 1 1 1 0 1 0 1 1 1 0 1 0 1 0 1 0 1 0 1 0 1 | 19 | 18.8% |
| 128 | 0 1 0 1 1 1 0 1 0 1 0 1 1 1 0 1 0 1 1 1 0 1 0 1 0 1 1 1 0 1 0 1 | 20 | 25.0% |
| 160 | 1 1 0 1 1 1 0 1 0 1 0 1 1 1 0 1 0 1 1 1 0 1 0 1 1 1 1 1 0 1 0 1 | 21 | 31.3% |
| 192 | 1 1 0 1 1 1 0 1 0 1 0 1 1 1 0 1 1 1 0 1 1 1 0 1 0 1 1 1 1 1 0 1 | 22 | 37.5% |

Table 1

| Clock# | GROUP B CLOCK ENABLE | Pulses | % Freq |
|---|---|---|---|
| 0 | 1 0 1 0 1 0 1 0 1 0 1 0 1 0 1 0 1 0 1 0 1 0 1 0 1 0 1 0 1 0 1 0 | 16 | 0.0% |
| 32 | 1 0 1 0 0 0 0 0 1 0 1 0 1 0 1 0 1 0 1 0 1 0 1 0 1 0 1 0 1 0 1 0 | 14 | -12.5% |
| 64 | 1 0 1 0 0 0 0 0 1 0 1 0 1 0 1 0 1 0 0 0 0 0 1 0 1 0 1 0 1 0 1 0 | 12 | -25.0% |
| 96 | 1 0 1 0 0 0 0 0 1 0 1 0 0 0 0 0 1 0 0 0 0 0 1 0 1 0 1 0 1 0 1 0 | 10 | -37.5% |
| 128 | 1 0 1 0 0 0 0 0 1 0 1 0 0 0 0 0 1 0 0 0 0 0 1 0 1 0 0 0 0 0 1 0 | 8 | -50.0% |
| 160 | 1 0 0 0 0 0 0 0 1 0 1 0 0 0 0 0 1 0 0 0 0 0 1 0 1 0 0 0 0 0 1 0 | 6 | -62.5% |
| 192 | 1 0 0 0 0 0 0 0 1 0 1 0 0 0 0 0 0 0 0 0 0 0 1 0 1 0 0 0 0 0 1 0 | 4 | -75.0% |

Table 2

| Clock# | GROUP C CLOCK ENABLE SCHEME 1 | Pulses | % Freq |
|---|---|---|---|
| 0 | 0 1 0 1 0 1 0 1 0 1 0 1 0 1 0 1 0 1 0 1 0 1 0 1 0 1 0 1 0 1 0 1 | 16 | 0.0% |
| 32 | 0 1 0 1 0 1 0 1 0 1 0 1 0 1 0 1 0 1 0 1 0 1 0 1 0 1 0 1 0 1 0 1 | 16 | 0.0% |
| 64 | 0 1 0 1 0 1 0 1 0 1 0 1 0 1 0 1 0 1 0 1 0 1 0 1 0 1 0 1 0 1 0 1 | 16 | 0.0% |
| 96 | 0 1 0 1 0 1 0 1 0 1 0 1 0 1 0 1 0 1 0 1 0 1 0 1 0 1 0 1 0 1 0 1 | 16 | 0.0% |
| 128 | 0 1 0 1 0 1 0 1 0 1 0 1 0 1 0 1 0 1 0 1 0 1 0 1 0 1 0 1 0 1 0 1 | 16 | 0.0% |
| 160 | 0 1 0 1 0 1 0 1 0 1 0 1 0 1 0 1 0 1 0 1 0 1 0 1 0 1 0 1 0 1 0 1 | 16 | 0.0% |
| 192 | 0 1 0 1 0 1 0 1 0 1 0 1 0 1 0 1 0 1 0 1 0 1 0 1 0 1 0 1 0 1 0 1 | 16 | 0.0% |

Table 3

| Clock# | GROUP C CLOCK ENABLE SCHEME 2 | Pulses | % Freq |
|---|---|---|---|
| 0 | 1 0 1 0 1 0 1 0 1 0 1 0 1 0 1 0 1 0 1 0 1 0 1 0 1 0 1 0 1 0 1 0 | 16 | 0.0% |
| 32 | 1 0 1 0 1 0 1 0 1 0 1 0 1 0 1 0 1 0 1 0 1 0 1 0 1 0 1 0 1 0 1 0 | 16 | 0.0% |
| 64 | 1 0 1 0 1 0 1 0 1 0 1 0 1 0 1 0 1 0 1 0 1 0 1 0 1 0 1 0 1 0 1 0 | 16 | 0.0% |
| 96 | 1 0 1 0 1 0 1 0 1 0 1 0 1 0 1 0 1 0 1 0 1 0 1 0 1 0 1 0 1 0 1 0 | 16 | 0.0% |
| 128 | 1 0 1 0 1 0 1 0 1 0 1 0 1 0 1 0 1 0 1 0 1 0 1 0 1 0 1 0 1 0 1 0 | 16 | 0.0% |
| 160 | 1 0 1 0 1 0 1 0 1 0 1 0 1 0 1 0 1 0 1 0 1 0 1 0 1 0 1 0 1 0 1 0 | 16 | 0.0% |
| 192 | 1 0 1 0 1 0 1 0 1 0 1 0 1 0 1 0 1 0 1 0 1 0 1 0 1 0 1 0 1 0 1 0 | 16 | 0.0% |

FIG. 4    Table 3a

| Clock# | GROUP A CLOCK ENABLE | Pulses | % Freq |
|---|---|---|---|
| 0 | 0 1 0 1 0 1 0 1 0 1 0 1 0 1 0 1 0 1 0 1 0 1 0 1 0 1 0 1 0 1 0 1 | 16 | 0.0% |
| 32 | 0 0 0 1 0 1 0 1 0 1 0 1 0 1 0 1 0 1 0 1 0 1 0 1 0 1 0 1 0 1 0 1 | 15 | -6.3% |
| 64 | 0 0 0 1 0 1 0 1 0 1 0 1 0 1 0 1 0 0 0 1 0 1 0 1 0 1 0 1 0 1 0 1 | 14 | -12.5% |
| 96 | 0 0 0 1 0 1 0 1 0 0 0 1 0 1 0 1 0 0 0 1 0 1 0 1 0 1 0 1 0 1 0 1 | 13 | -18.8% |
| 128 | 0 0 0 1 0 1 0 1 0 0 0 1 0 1 0 1 0 0 0 1 0 1 0 1 0 0 0 1 0 1 0 1 | 12 | -25.0% |
| 160 | 0 0 0 1 0 0 0 1 0 1 0 1 0 0 0 1 0 1 0 1 0 0 0 1 0 0 0 1 0 1 0 1 | 11 | -31.3% |
| 192 | 0 0 0 1 0 0 0 1 0 1 0 1 0 0 0 1 0 0 0 1 0 1 0 0 0 1 0 1 0 1 0 1 | 10 | -37.5% |
| 224 | 0 0 0 1 0 0 0 1 0 0 0 1 0 1 0 0 0 1 0 0 0 1 0 0 0 1 0 0 0 1 0 1 | 9 | -43.8% |
| 256 | 0 0 0 1 0 0 0 1 0 0 0 1 0 0 0 1 0 0 0 1 0 0 0 1 0 0 0 1 0 0 0 1 | 8 | -50.0% |

Table 4

| Clock# | GROUP B CLOCK ENABLE | Pulses | % Freq |
|---|---|---|---|
| 0 | 1 0 1 0 1 0 1 0 1 0 1 0 1 0 1 0 1 0 1 0 1 0 1 0 1 0 1 0 1 0 1 0 | 16 | 0.0% |
| 32 | 1 1 1 0 1 0 1 0 1 0 1 0 1 0 1 0 1 0 1 0 1 0 1 0 1 0 1 0 1 0 1 0 | 18 | 12.5% |
| 64 | 1 1 1 0 1 0 1 0 1 0 1 0 1 0 1 0 1 1 1 0 1 0 1 0 1 0 1 0 1 0 1 0 | 20 | 25.0% |
| 96 | 1 1 1 0 1 0 1 0 1 1 1 0 1 0 1 0 1 1 1 0 1 0 1 0 1 0 1 0 1 0 1 0 | 22 | 37.5% |
| 128 | 1 1 1 0 1 0 1 0 1 1 1 0 1 0 1 0 1 1 1 0 1 0 1 0 1 1 1 0 1 0 1 0 | 24 | 50.0% |
| 160 | 1 1 1 0 1 1 1 0 1 0 1 0 1 1 1 0 1 0 1 0 1 1 1 0 1 1 1 0 1 0 1 0 | 26 | 62.5% |
| 192 | 1 1 1 0 1 1 1 0 1 0 1 0 1 1 1 0 1 1 1 0 1 0 1 1 1 0 1 0 1 0 1 0 | 28 | 75.0% |
| 224 | 1 1 1 0 1 1 1 0 1 1 1 0 1 0 1 1 1 0 1 1 1 0 1 1 1 0 1 1 1 0 1 0 | 30 | 87.5% |
| 256 | 1 1 1 1 1 1 1 1 1 1 1 1 1 1 1 1 1 1 1 1 1 1 1 1 1 1 1 1 1 1 1 1 | 32 | 100.0% |

Table 5

| Clock# | GROUP C CLOCK ENABLE SCHEME 1 | Pulses | % Freq |
|---|---|---|---|
| 0 | 0 1 0 1 0 1 0 1 0 1 0 1 0 1 0 1 0 1 0 1 0 1 0 1 0 1 0 1 0 1 0 1 | 16 | 0.0% |
| 32 | 0 1 0 1 0 1 0 1 0 1 0 1 0 1 0 1 0 1 0 1 0 1 0 1 0 1 0 1 0 1 0 1 | 16 | 0.0% |
| 64 | 0 1 0 1 0 1 0 1 0 1 0 1 0 1 0 1 0 1 0 1 0 1 0 1 0 1 0 1 0 1 0 1 | 16 | 0.0% |
| 96 | 0 1 0 1 0 1 0 1 0 1 0 1 0 1 0 1 0 1 0 1 0 1 0 1 0 1 0 1 0 1 0 1 | 16 | 0.0% |
| 128 | 0 1 0 1 0 1 0 1 0 1 0 1 0 1 0 1 0 1 0 1 0 1 0 1 0 1 0 1 0 1 0 1 | 16 | 0.0% |
| 160 | 0 1 0 1 0 1 0 1 0 1 0 1 0 1 0 1 0 1 0 1 0 1 0 1 0 1 0 1 0 1 0 1 | 16 | 0.0% |
| 192 | 0 1 0 1 0 1 0 1 0 1 0 1 0 1 0 1 0 1 0 1 0 1 0 1 0 1 0 1 0 1 0 1 | 16 | 0.0% |
| 224 | 0 1 0 1 0 1 0 1 0 1 0 1 0 1 0 1 0 1 0 1 0 1 0 1 0 1 0 1 0 1 0 1 | 16 | 0.0% |
| 256 | 0 1 0 1 0 1 0 1 0 1 0 1 0 1 0 1 0 1 0 1 0 1 0 1 0 1 0 1 0 1 0 1 | 16 | 0.0% |

Table 6

FIG. 5

METHOD AND DEVICE FOR NOISE
REDUCTION IN MULTI-FREQUENCY
CLOCKING ENVIRONMENT

FIELD OF THE DISCLOSURE

The present disclosure is related to methods and devices for providing multi-frequency clocking. The present disclosure is related more specifically to methods and devices for providing multi-frequency synchronous clocking between domains that share a power source.

BACKGROUND

Processors such as graphics engines experience temporal bursts of processing needs within their sub-systems. In order to respond to these needs, architects employ multi-frequency clocking to apply a higher frequency when sub-systems need it, and reducing the clocking when it is not needed.

Multi-Frequency Clocking is a technique to save dynamic power of application-specific integrated circuits (ASICs). When multiple entities or domains share a clock source, those entities/domains are referred to as being synchronous with respect to their clocking.

The production of varying frequencies between portions of a synchronous environment is achieved by causing one portion to see less or more of the clock signal compared to what other portions see. One such way is to cause one domain/portion to "skip" clock pulses.

Each clock pulse potentially causes bits of the processing engine to change state. This change of state is manifested in the charging or discharging of a capacitor for a register bit as well as all the standard cell logic connected to the output of that register bit. Skipping a clock pulse, or adding an extra clock pulse, causes a change in the timing of the charging and discharging of the capacitors.

The power for charging of the capacitors is provided via a power supply. Skipping clock pulses reduces current draw (and thus power draw/power consumption) from the power source.

This change in power draw, across a rapidly changing clocking scheme can produce a disturbance in the power delivered by the power supply. This disturbance manifests itself as a "noisy" power signal. A noisy power signal negatively impacts performance of the ASIC.

Accordingly, there exists a need for a device and method for providing multi-frequency clocking in a synchronous frequency environment that reduces the noise imparted on the power signal thereby.

BRIEF DESCRIPTION OF THE DRAWINGS

FIG. 4 is a set of tables showing sets of sub-clock pulse schemes;

FIG. 5 is a set of tables showing other sets of sub-clock pulse schemes; and

DETAILED DESCRIPTION OF EMBODIMENTS

In an exemplary and non-limited embodiment, some aspects of the invention are embodied in a method of operating a synchronous frequency processing environment served by a common power source and common clock source. The method includes operating the processing environment to have a first power consumption. The method further includes determining a first synchronous frequency processing domain within the processing environment where it is desired to implement a first clock frequency alteration in a clock signal for the first synchronous frequency processing domain. The first clock frequency alteration generates an associated first alteration in power consumption of the first synchronous frequency processing domain. The method further includes determining a second clock frequency alteration to a clock signal for a second synchronous frequency processing domain of the processing environment. The second clock frequency alteration is determined so as to reduce a change in the first power consumption caused by the first alteration in power consumption.

In another example, a power distributor is provided including: a clock signal output carrying first clock signal instructions for a first synchronous frequency domain powered by a first power source and second clock signal instructions for a second synchronous frequency domain powered by the first power source, the first and second synchronous frequency domains providing a first power draw on the first power source; and instructions, that when executed by the power distributor provide that an alteration to the first clock signal is accompanied with an alteration to a the second clock signal that reduces any impact that the alteration to the first clock signal has on the first power draw.

In yet another example, a non-transitive computer readable medium is provided having instructions thereon, that when interpreted by a processor, cause the processor to: operate a synchronous frequency processing environment served by a common power source and common clock source processing environment to have a first power consumption; determine a first synchronous frequency processing domain within the processing environment where it is desired to implement a first clock frequency alteration in a clock signal for the first synchronous frequency processing domain; the first clock frequency alteration generating an associated first alteration in a power consumption therefrom; and determine a second clock frequency alteration to a clock signal for a second synchronous frequency processing domain of the processing environment, the second clock frequency alteration being determined so as to reduce a change in the first power consumption caused by the first alteration in power consumption.

Figure 1:
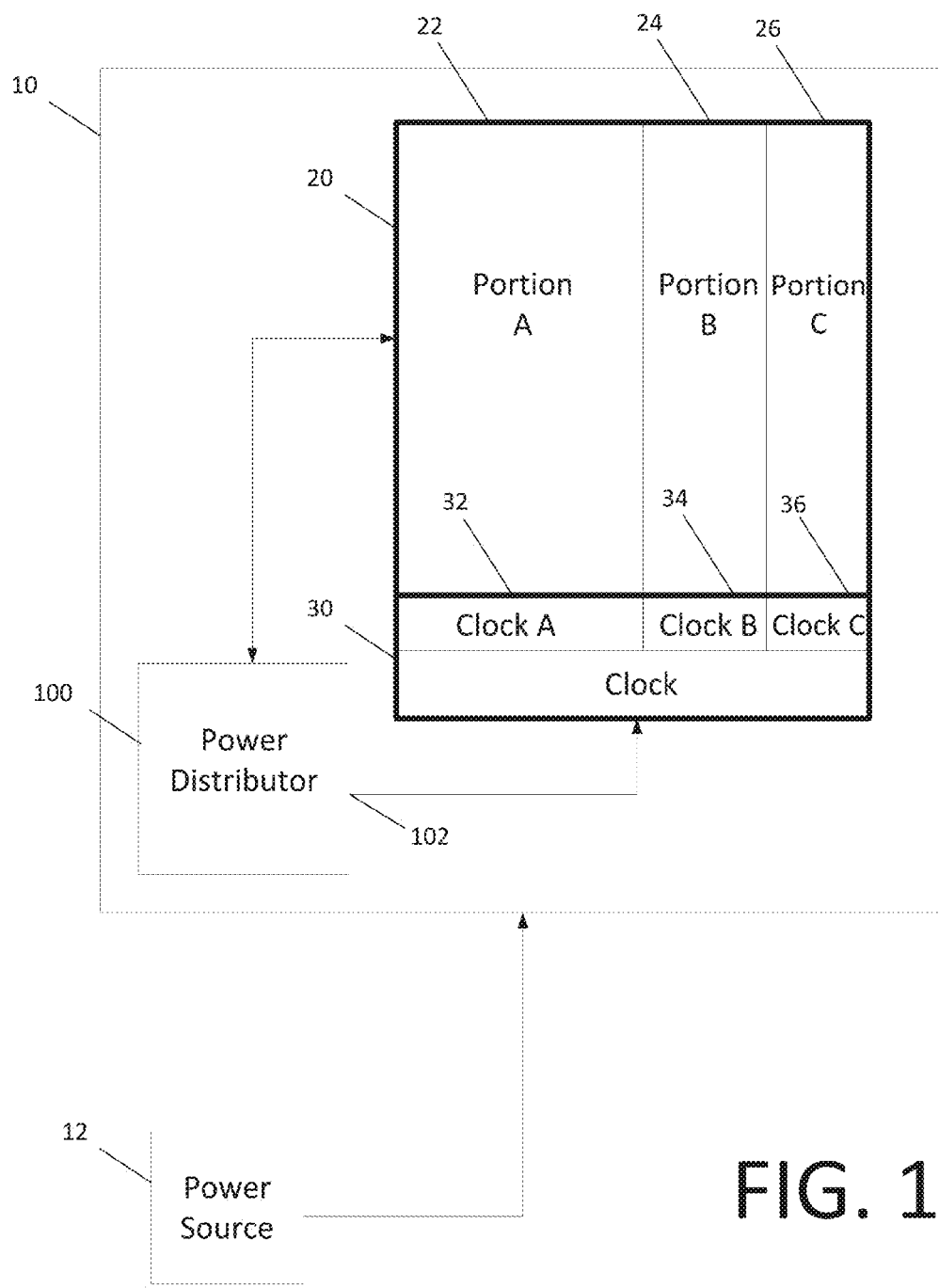
FIG. 1 is a diagram showing an exemplary first embodiment architecture of a system employing the multi-frequency clocking technology of the present disclosure.

FIG. 1 shows a computing system 10 including a power source 12, a processor 20, a clock source 30, and a power distributor 100. The power source 12 is a conventional power source and supplies regulated DC power to computing components. The power source 12 illustratively conforms to the ATX specification. The power source 12 supplies power to the processor 20. In the present example, the power source 12 supplies power to multiple synchronous frequency processing domains at the direction of the processor 20, the power distributor 100 or a combination thereof.

The processor 20 is divided into functional tiles that are able to operate together for a common purpose. These functional tiles are illustratively grouped as shown as a Portion A 22, a Portion B 24, and a Portion C 26. The Portions A-C 22, 24, 26 can also be referred to as processing domains. For purposes of providing an illustrative description, the processor 20 is discussed herein as a graphics processor. The Portion A 22 is illustratively formed of Arithmetic Logic Unit tiles. The Portion B 24 is illustratively formed of Texture tiles. The Portion C 26 is illustratively formed of "other" tiles. Each of the Portions A-C 22, 24, 26 is served by the common power source 10 and the common clock source 30.

The clock source 30 is clock that serves the processor 20, including all of the Portions A-C 22, 24, 26. The clock source 30 provides a common clock signal that is usable by all of the Portions A-C 22, 24, 26. However, the actual clock signal delivered to each of the Portions A-C 22, 24, 26 is able to be differentiated by skipping or adding clock pulses for one or more of the Portions A-C 22, 24, 26. The differentiation of clock signals seen by the Portions A-C effectively produces "sub-clocks" for each the Portion A-C 22, 24, 26. The use of the same clock source 30 and differentiating the delivered clock by skipping or adding pulses provides that the clock pulses delivered to the Portions A-C 22, 24, 26 are synchronous with each other. Accordingly, the Portions A-C 22, 24, 26 are synchronous frequency processing domains.

Adding pulses within a clock signal increases the speed of processing for the portion that the clock signal is serving. Similarly, skipping clock pulses reduces the speed of processing for the portion that the clock signal is serving. However, adding clock pulses increases the power being consumed by the processing portion and skipping clock pulses serves to lower the power being consumed by the processing portion being operated by the clock portion.

The power distributor 100 is illustratively a processor executing code. Indeed, in some embodiments, power distributor 100 is code being executed in one of the Portions A-C 22, 24, 26 or in a processor distinct from the processor 20. However, embodiments are envisioned using any unit capable of providing the clock instruction functionality described herein for the power distributor 100. The power distributor 100 includes a clock signal output 102 that carries clock signal instructions to instruct the clock source 30 in the setting of one or more of sub-clocks 32, 34, 36. The manner of operation for the power distributor 100 is discussed in more detail below. Furthermore, while the power distributor 100 is discussed as distributing power, it is equally correct to call the element a current distributor in that it also performs this operation.

In the provided example, the tiles of the Portion A 22 constitute approximately 45.90% of the area of the processor 20. The Portion B 24 makes up 21.5% of the area of the processor 20. The Portion C 26 makes up the remaining 32.6% of the area of the processor 20.

Figure 1A:
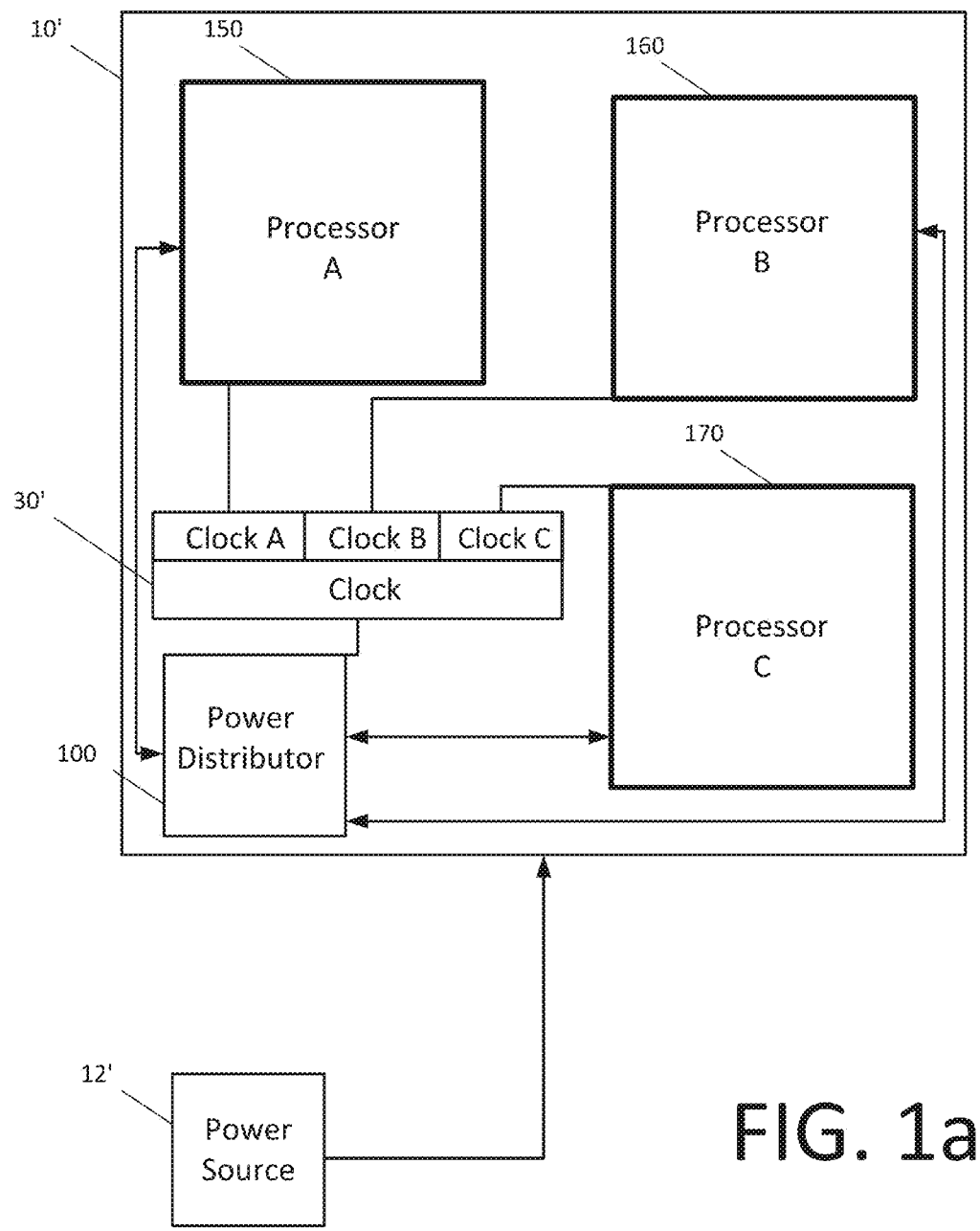
FIG. 1a is a diagram showing an exemplary second embodiment architecture of a system employing the multi-frequency clocking technology of the present disclosure.

Similarly, FIG. 1a shows a second embodiment computing system 10' that includes multiple distinct processors 150, 160, 170. The processors 150, 160, 170 are served by a common clock source 30' and a power source 12'. Like the clock source 30, a signal from clock source 30' can be customized for each processor 150, 160, 170. Again, the processors 150, 160, 170 are considered to provide synchronous frequency processing domains.

Each clock pulse received by a domain provides an opportunity for bits within that domain to change state (0 to 1 or 1 to 0). This change in state is achieved by the charging or discharging of capacitors associated with the bit. Accordingly, power draw is associated with a clock event. Furthermore, an increase in clock frequency generates an increase in power draw/power consumption. The system is operated having a first current draw/power consumption from the power source 12, 12'.

Certain operations, such as operations in the Portion A 22, at various times can benefit from an increase in clock frequency, such as during processing intensive operations. Table 1 of FIG. 4 shows a clocking scheme for the Portion A 22 to provide such an increase in clock frequency. Table 1, as well as Tables 2, 3, and 3a, shows a clocking scheme through two-hundred-twenty-four clock pulse opportunities, with each individual square in the table representing one clock pulse opportunity via the existence of a clock pulse from clock 30 that can be implemented by the sub-clocks 32, 32', 34, 34', 36, 36'. Accordingly, each square represents an opportunity for the sub-clocks 32, 32' (as well as 34, 36, 34', 36') to provide a clock pulse to their respective Portions 22, 24, 26. The left column (labelled "Clock #") is a reference to indicate how many clock opportunities have elapsed as of the start of the row. The top left corner is the start such that no clock opportunities have elapsed. The top row includes thirty-two clock opportunities such that the first entry in the second row represents the thirty-third clock opportunity. In each box, a "0" represents the sub-clock not instituting a clock signal at the opportunity, or a clock "skip." A "1" represents the sub-clock instituting a clock signal at the opportunity. Accordingly, each row of the table presents thirty-two clock pulse opportunities.

At an exemplary baseline, the Portion A implements clock skipping such that a clock pulse is supplied to the Portion A 22 every second pulse generated by the clock 30. This baseline is shown in the first row (opportunities 1-32). Using every second pulse provides that opportunities one to thirty-two generate sixteen pulses. This is shown in the column labelled "Pulses." The column "% Freq" indicates the change in clocking frequency for a given thirty-two clocking opportunities of a row relative to the first row.

Table 1, FIG. 4, shows where certain pulses that would normally be skipped (in a scheme that pulses every other opportunity) are not skipped but rather delivered to the Portion A 22 (shown within bolded boxes, the first of which is at opportunity number thirty-seven). This results in an effective increase in the clock frequency seen by the Portion A 22. This increase in clock frequency likewise generates an increase in power consumption (current draw) for the Portion A 22 from the power source 12. More specifically, the added clock pulse of opportunity thirty-seven is the only added clock pulse within opportunities thirty-three through sixty-four. This provides seventeen pulses over this range and results in a 6.3% increase in frequency over that range. Clocking schemes that provide additional increases in frequency are shown on the following rows.

Table 2 of FIG. 4 represents a second sub-clock signal provided to the Portion B 24 and generated to offset the power/current changes caused by the change in the first sub-signal (Table 1). The clock opportunities of Table 2 are the same opportunities of Table 1 (and 3 and 3a) (but not the same scheme, meaning that the opportunity represented by the first box of Table 2 (3, 3a) is the opportunity being generated by the same clock signal from the clock 30 that is providing the opportunity illustrated by the first box of Table 1). Thus, while not all of the Portions take advantage of the opportunity of the first box (due to different clocking schemes), a "1" in the first box of all Tables, would indicate that all the Portions 22, 24, 26 are receiving a pulse at the same time (when the clock 30 provides the first opportunity). With the exception of the clocking schemes depicted therein, interpretation of Table 2 (and Table 3 and 3a) is the same as interpretation of Table 1. In the example of FIG. 4, changes to the second sub-clock signal (Table 2) attempt to fully offset the changes in power/current caused by changes in the first sub-clock signal (Table 1). It should be appreciated that the Portion A 22 is approximately twice as big as the Portion B 24 in area. Accordingly, assuming uniform capacitance density within the Portions 22, 24, 26, which will not always be the case, a given change for the Portion A 22 has twice the impact on power/current draw as a similar change for the Portion B 24. Accordingly, it is seen that each extra pulse in the signal provided to the Portion A 22 (Table 1) is matched with two skipped pulses in the signal provided to the Portion B 24 (Table 2). Furthermore, the skipped pulses in the signal provided to the Portion B 24 are skipped proximate (in time) when the extra clock pulse is provided to the Portion A 22 (pulse opportunity thirty-seven of Table 1 vs. thirty-seven & thirty-nine of Table 2, etc.). Again, the provided examples assume uniform capacitance density within the Portions 22, 24, 26, if there were significant differences in the capacitances of the domains (such as the Portion A 22, the Portion B 24) such differences would also be considered in crafting the offsetting sub-clock signal for the other portions (such as the Portion B 24).

While the embodiment shown in Tables 1 and 2 of FIG. 4 aims to fully offset the impact of the changes to the first sub-clock signal, embodiments are envisioned where the second sub-signal does not fully offset the changes. In such embodiments, declining to fully offset the changes may be made to retain a certain level of functionality for the Portion B 24, or for any other desired reason.

Additionally, as shown in Table 3a, in some embodiments, the third sub-clock signal provided to Portion C 26 is altered to contribute to offsetting changes in power/current caused by changes to other sub-clock signals. Table 3a shows an inversion of the third sub-clock signal relative to the signal shown in Table 3 (which is also an embodiment provided to Portion C 26). As will be appreciated when viewing the first column of each of Tables 1, 2, 3, 3a, use of the sub-clock signal of Table 3a (combined with the sub-clock signals of Tables 1 and 2) instead of the sub-clock signal of Table 3 presents a smaller power draw delta between successive clocking opportunities. (such that when the overall scheme progresses from one opportunity to another, the change in power draw between successive opportunities is smaller when the scheme of Table 3a is used concurrently with the schemes of Tables 1 and 2 relative to using the scheme Table 3 concurrently with the schemes of Tables 1 and 2). Accordingly, use of the inverted signal of Table 3a presents an overall profile with a smaller change of power draw between successive clock pulse opportunities (but a change from the scheme of Table 3 to the scheme of Table 3a does not alter the total number of pulses delivered and power consumed by the Portion C 26, it changes the timing of the pulses delivered to the Portion C 26). Stated differently, the total clock pulse density becomes more uniform. Tables 4, 5, 6 of FIG. 5 show a similar set of sub-clocking schemes (Table 4 is an alternative clocking scheme for the Portion A 22, Table 5 is an alternative clocking scheme for the Portion B 24, and Table 6 is an alternative clocking scheme for the Portion C 26) that provide the Portion B 24 with increased performance (and power/current draw) while reducing the draw of the Portion A 22. Tables 4, 5, 6 of FIG. 5 show two-hundred-eighty-eight clock opportunities and show different clocking schemes but are otherwise interpreted in a similar manner to the tables of FIG. 4. Again, the clocking schemes of FIG. 5 are provided to allow for increased power in certain Portions while reducing variation in the overall power draw of the processor 20.

Figure 2:
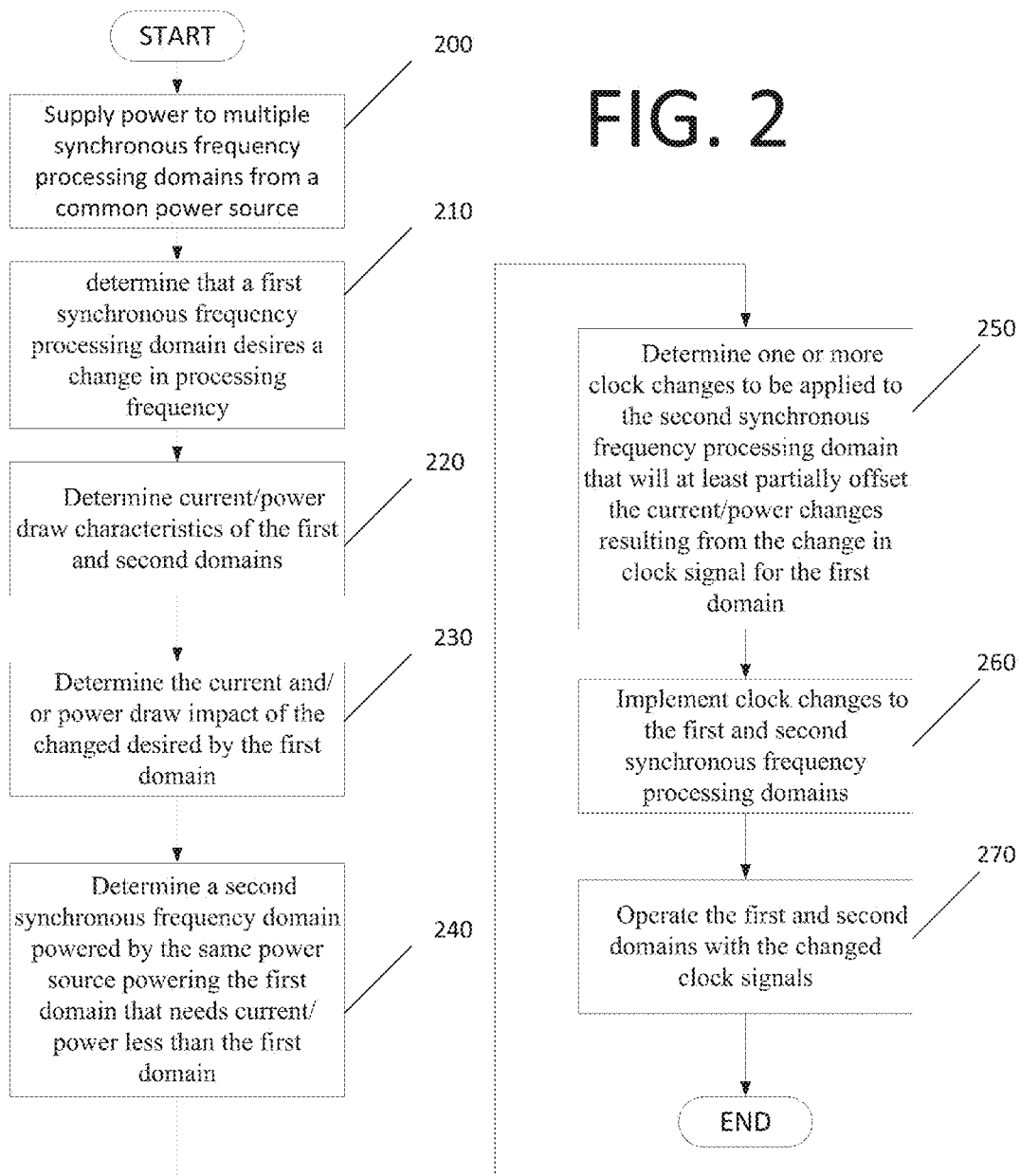
FIG. 2 is a flowchart showing exemplary operation of the systems of FIGS. 1 and 2 according to an embodiment of the disclosure.

FIG. 2 depicts one embodiment of operations of the power distributor 100 that can govern the supplying of power to multiple synchronous frequency processing domains from a common power source, block 200 (FIG. 2).

The power distributor 100 determines that the Portion (domain) A 22 requests or desires a change (such as an increase) in computing power (clock frequency/clock signal) such as the clock signal shown in Table 1 of FIG. 4, block 210 (FIG. 2). The power distributor 100 further determines a change in power draw (or current draw or any other related concept) represented by the requested/desired change in clock signal. The change in power draw is a function of the change in frequency, the size of the domain governed by the clock signal, and the capacitance per unit area of the domain, along with other criteria that is apparent to a person of skill. It should be appreciated that the examples discussed herein will assume a constant capacitance per unit area across all domains. However, it is explicitly understood that this will not always be the case and any differences are considered by the power distributor 100. The power distributor 100, via the characteristics of the Portions A-C 22, 24, 26 is able to determine current/power draw characteristics therefor, block 220 (FIG. 2). The power distributor 100, via the characteristics of the Portions A-C 22, 24, 26 is further able to determine changes in current/power draw characteristics that are expected from the desired change in clock signal for the Portion A 22, block 230 (FIG. 2). Having determined an impact upon power draw (or current draw, etc.) represented by the change/alteration in the clock signal to one domain (the first sub-clock signal), power distributor then considers the other domains also powered by the power source 12, 12' and controlled by the clock 30, 30'. In one embodiment, the power distributor 100 determines if another domain is in less need of power than the domain requesting more power, block 240 (FIG. 2). It should be appreciated that considering/determining other domains controlled by the power source 12 may be performed prior to determining the impact of a change in clock signal.

The power distributor 100 determines a change in clock signal to one of the other domains (second or third sub-clock signal, such as that depicted in Tables 2, 3, 3a) that will at least partially offset the impact on the power/current draw from the power source 12, 12' caused by the change in the first sub-clock signal, block 250 (FIG. 2).

Having determined at least partially offsetting changes in clock signals for various partitions, the clocks signals are implemented, block 260 (FIG. 2), and the various partitions are then operated according to the implemented clock signals, block 270 (FIG. 2).

It should be further understood that while the provided clocking schemes of FIGS. 4 & 5 show a clock reduction in one domain and a clock increase in another domain, embodiments are envisioned where a clock reduction (or increase) in one domain is coupled with clock increases (or reductions) in multiple other domains. Overall, the power distributor 100 operates to determine desired operation parameters for various domains and then determines a set of clock signals that implements the operation parameters while providing a reduced perturbation in power/current draw relative to the perturbation that would be experienced/expected given a clock change to only one domain.

Accordingly, it should be appreciated that the power distributor 100 serves to distribute (and redistribute) power being drawn from the power source 12, 12' to reduce, and in some cases minimize, fluctuations in power/current draw. Decisions on distribution are driven by the desire to reduce changes in current/power draw caused by changes in sub-clock signals and to reduce fluctuations in power/current draw from successive clock pulses. Such increases in uniformity provide a reduction in noise on the power signal in that large and/or quick changes in power/current draw generate noise on the signal through overshoot and/or droop.

Figure 3:
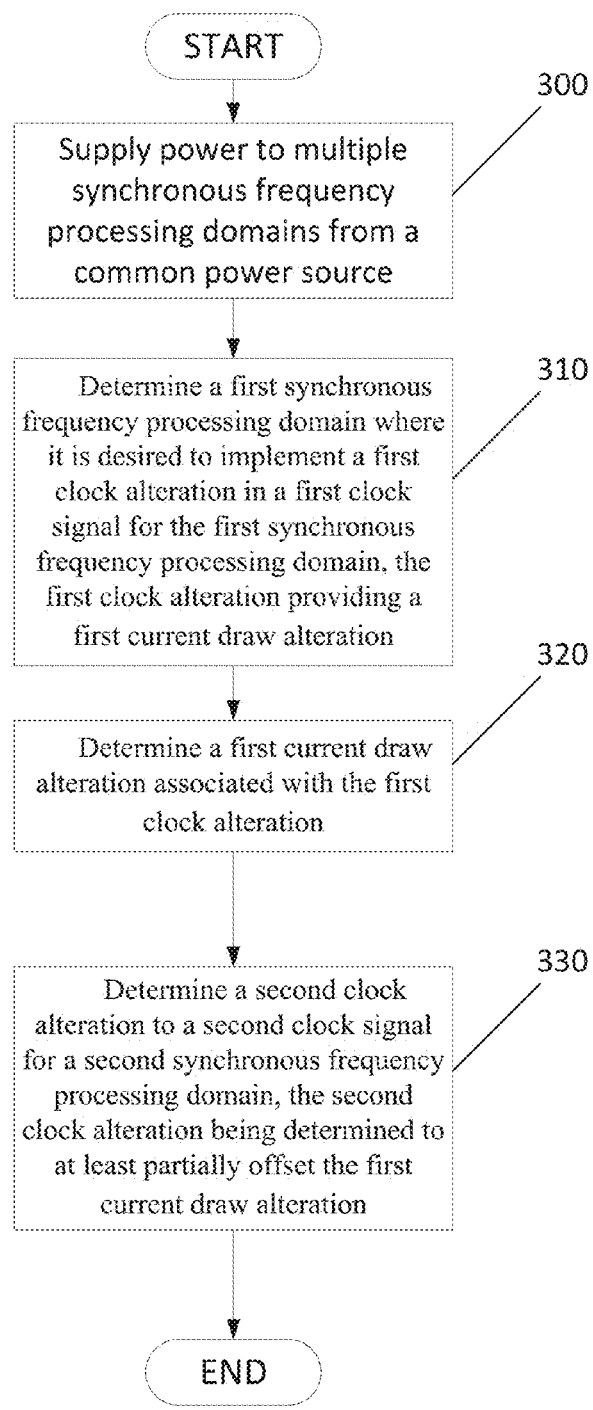
FIG. 3 is a flowchart showing exemplary operation of the systems of FIGS. 1 and 2 according to another embodiment of the disclosure.

FIG. 3 shows another embodiment of operations of the power distributor 100 that is governing the supplying of power to multiple synchronous frequency processing domains from a common power source, block 300. The power distributor 100 determines a first synchronous frequency processing domain where it is desired to implement a first clock alteration in a first clock signal for the first synchronous frequency processing domain. The first clock alteration provides a first current draw alteration, block 310. The first current draw alteration is determined, block 320. The power distributor 100 also determines a second clock alteration to a second clock signal for a second synchronous frequency processing domain. The second clock alteration is determined to at least partially offset the first current draw alteration, block 330.

Figure 6:
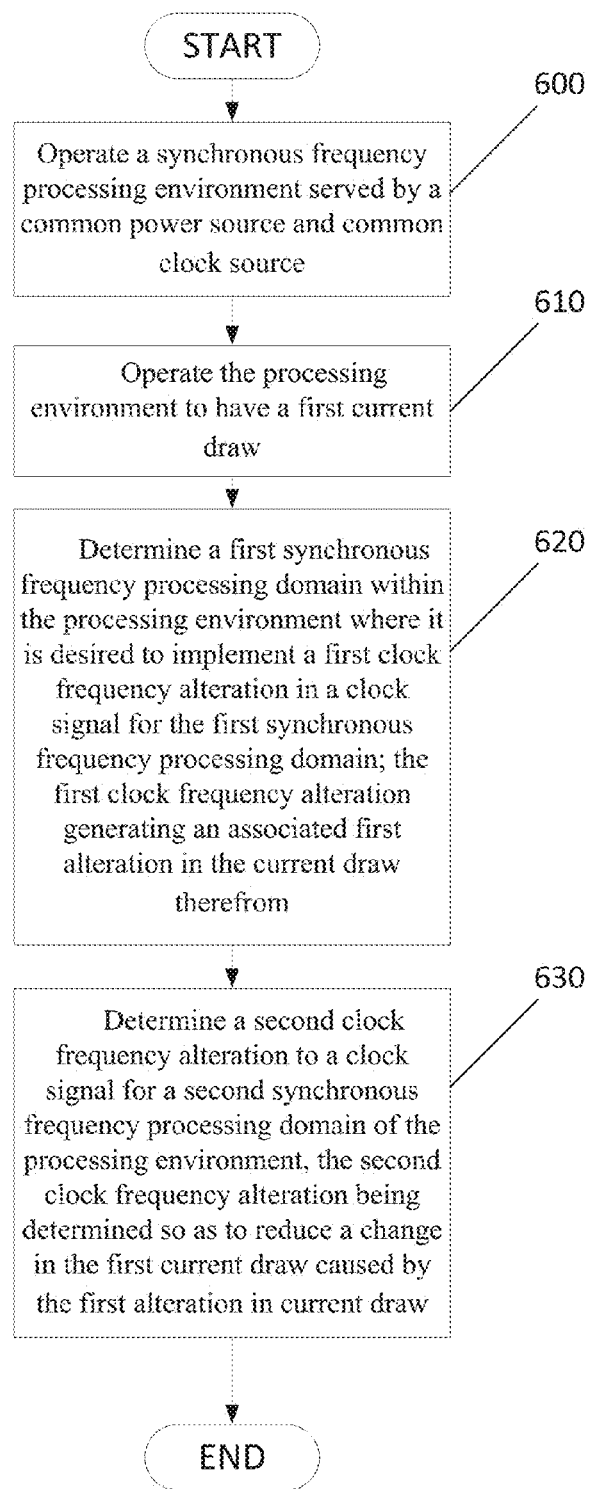
FIG. 6 is a flowchart showing exemplary operation of the systems of FIGS. 1 and 2 according to another embodiment of the disclosure.

FIG. 6 shows an embodiment of operating a synchronous frequency processing environment. The environment is served by a common power source and a common clock source, block 600. The environment is operated to have a first current draw, block 610. A first synchronous frequency processing domain within the processing environment is determined where it is desired to implement a first clock frequency alteration in a clock signal for the first synchronous frequency processing domain. The first clock frequency alteration, if implemented, is expected and/or known to generate an associated first alteration in the current draw therefrom, block 620. Other frequency domains are then considered to determine a second clock frequency alteration to a clock signal for a second synchronous frequency processing domain of the processing environment. The second clock frequency alteration is determined so as to reduce a change in the first current draw (the environment current draw) caused by the first alteration in current draw, block 630.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of operating a synchronous frequency processing environment served by a common power source and common clock source including:
   operating the processing environment to have a first power consumption;
   determining a first synchronous frequency processing domain within the processing environment where it is desired to implement a first clock frequency alteration in a clock signal for the first synchronous frequency processing domain; the first clock frequency alteration generating an associated first alteration in a power consumption from the first synchronous frequency processing domain; and
   determining a second clock frequency alteration to a clock signal for a second synchronous frequency processing domain of the processing environment, the second clock frequency alteration being determined so as to reduce a change in the first power consumption caused by the first alteration in power consumption.

2. The method of claim 1, further including determining the first power consumption alteration associated with the first clock alteration.

3. The method of claim 1, wherein the first alteration includes skipping a clock pulse; further wherein the second clock alteration includes adding clock pulses.

4. The method of claim 3, wherein the first synchronous frequency processing domain has a first size and the second synchronous frequency processing domain has a second size, wherein determining the at least a second clock frequency alteration includes determining the relative sizes of the first and second synchronous frequency processing domains.

5. The method of claim 4, wherein the proportion of the second clock frequency alteration to the first clock frequency alteration approximates the proportion of the size of the second frequency processing domain to the first frequency processing domain.

6. The method of claim 1, wherein the second clock frequency alteration is an inversion of the second clock signal.

7. The method of claim 1, further including determining a third clock frequency alteration to a third clock signal for a third synchronous frequency processing domain, the third clock frequency alteration being determined to at least partially offset a first power consumption alteration caused by the first clock frequency alteration.

8. The method of claim 1, wherein the first and second synchronous frequency domains are portions of a common processor.

9. The method of claim 1, wherein the first and second synchronous frequency domains are distinct processors.

10. A power distributor including:
a clock signal output carrying first clock signal instructions for a first synchronous frequency domain powered by a first power source and second clock signal instructions for a second synchronous frequency domain powered by the first power source, the first and second synchronous frequency domains providing a first power draw on the first power source; and
instructions, that when executed by the power distributor provide that an alteration to the first clock signal is accompanied with an alteration to a the second clock signal that reduces any impact that the alteration to the first clock signal has on the first power draw.

11. The power distributor of claim 10, wherein the alteration to the first clock signal includes skipping a clock pulse; further wherein the alteration to the second clock signal includes adding clock pulses.

12. The power distributor of claim 10, wherein the first synchronous frequency domain has a first size and the second synchronous frequency domain has a second size, wherein determining the at least a second clock alteration includes determining the relative sizes of the first and second portions.

13. The power distributor of claim 10, further including instructions that when executed by the power distributor determine a third clock alteration to a third clock signal for a third synchronous frequency processing domain, the third clock alteration being determined to at least partially offset the first power consumption alteration.

14. A non-transitive computer readable media having instructions thereon, that when interpreted by a processor, cause the processor to:
operate a synchronous frequency processing environment served by a common power source and common clock source processing environment to have a first power consumption;
determine a first synchronous frequency processing domain within the processing environment where it is desired to implement a first clock frequency alteration in a clock signal for the first synchronous frequency processing domain; the first clock frequency alteration generating an associated first alteration in a power consumption therefrom; and
determine a second clock frequency alteration to a clock signal for a second synchronous frequency processing domain of the processing environment, the second clock frequency alteration being determined so as to reduce a change in the first power consumption caused by the first alteration in power consumption.

15. The non-transitive computer readable media of claim 14, wherein the first alteration includes skipping a clock pulse; further wherein the second clock alteration includes adding clock pulses.

16. The non-transitive computer readable media of claim 14, wherein the first synchronous frequency processing domain has a first size and the second synchronous frequency processing domain has a second size, wherein determining the at least a second clock frequency alteration includes determining the relative sizes of the first and second synchronous frequency processing domains.

17. The non-transitive computer readable media of claim 16, wherein the proportion of the second clock frequency alteration to the first clock frequency alteration approximates the proportion of the size of the second frequency processing domain to the first frequency processing domain.

18. The non-transitive computer readable media of claim 14, wherein the second clock frequency alteration is an inversion of the second clock signal.

19. The non-transitive computer readable media of claim 14, wherein the instructions further cause the processor to determine a third clock frequency alteration to a third clock signal for a third synchronous frequency processing domain, the third clock frequency alteration being determined to at least partially offset a first power consumption alteration caused by the first clock frequency alteration.

20. The non-transitive computer readable media of claim 14, wherein the first and second synchronous frequency domains are portions of a common processor.

* * * * *